Patented Oct. 30, 1923.

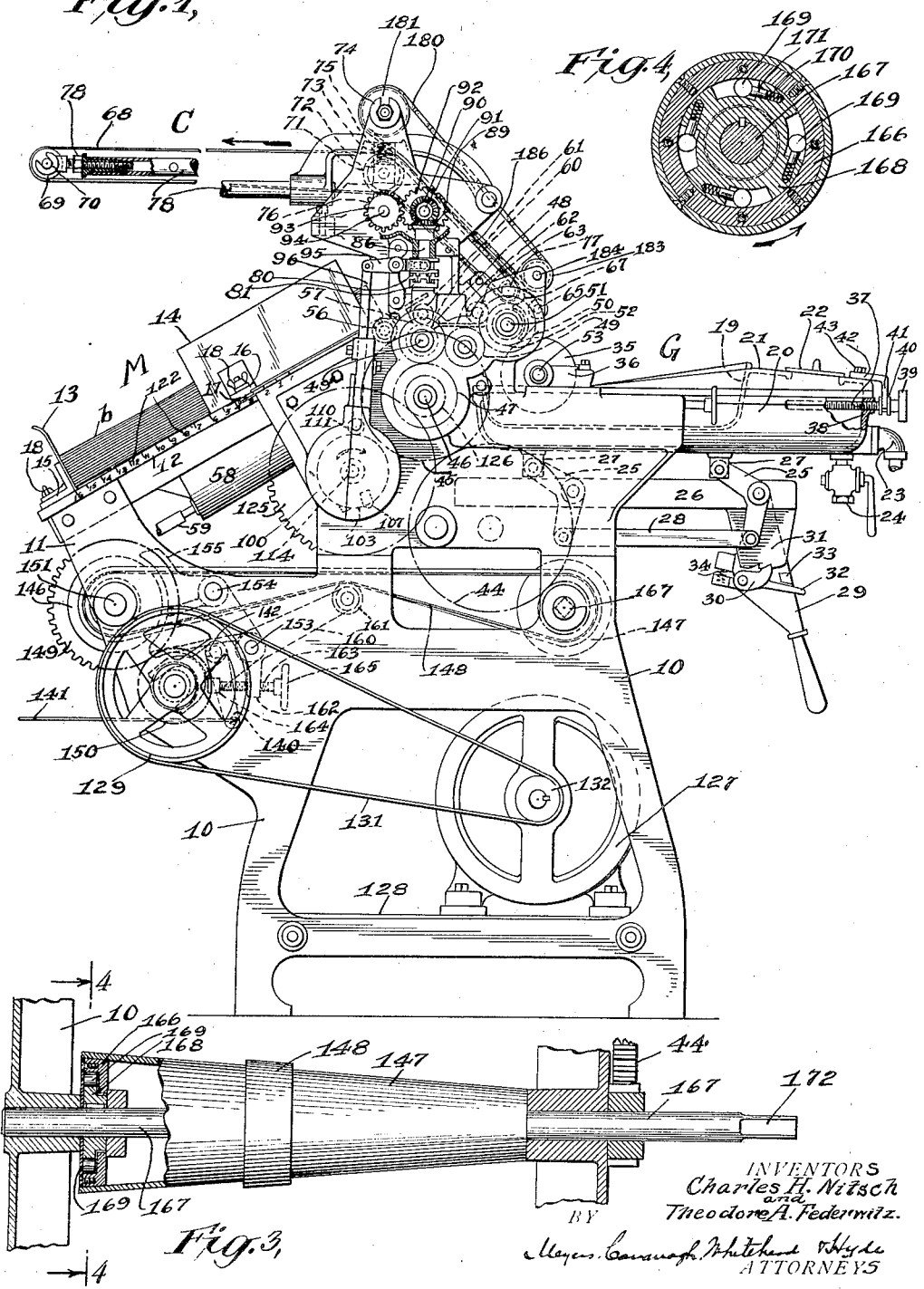

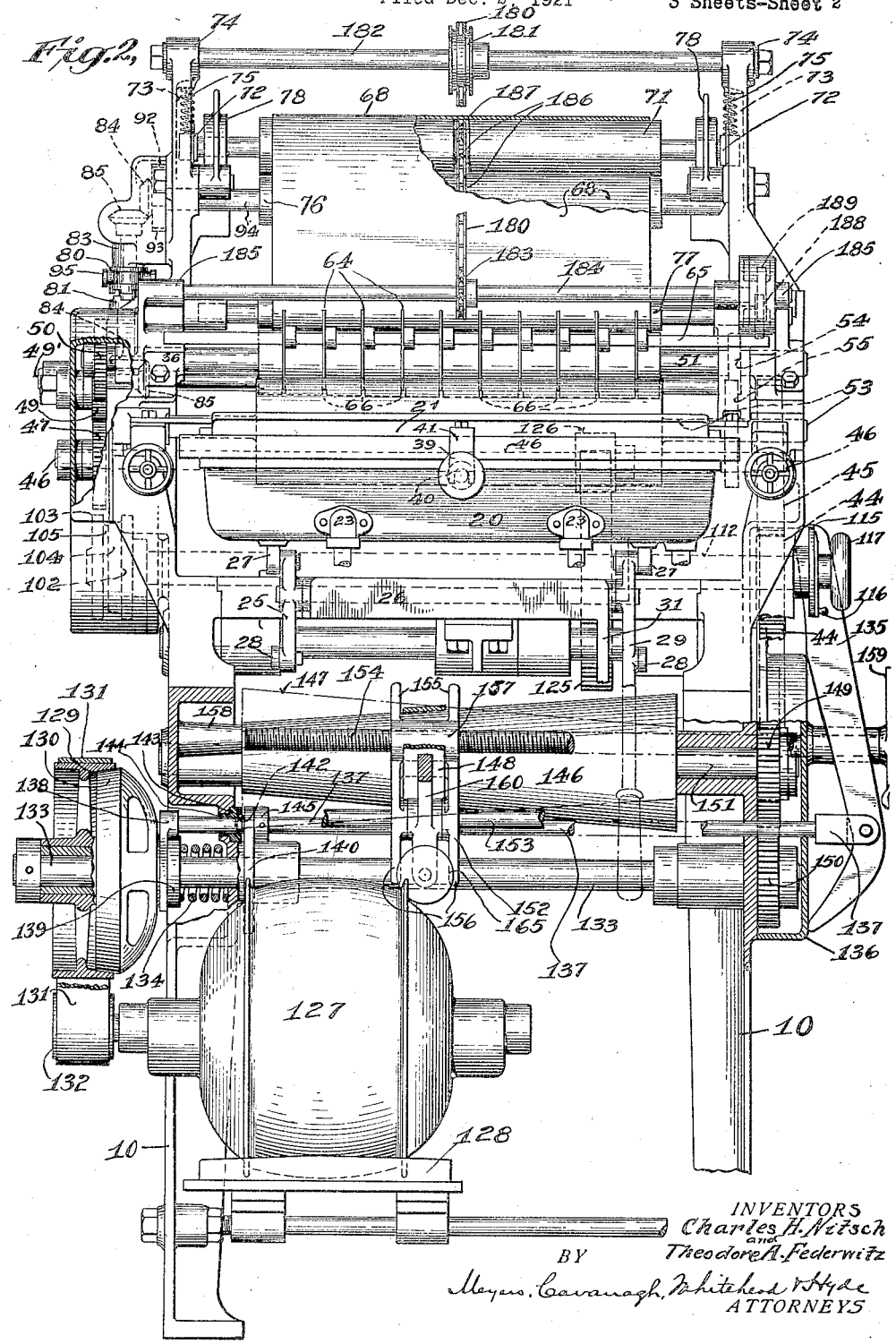

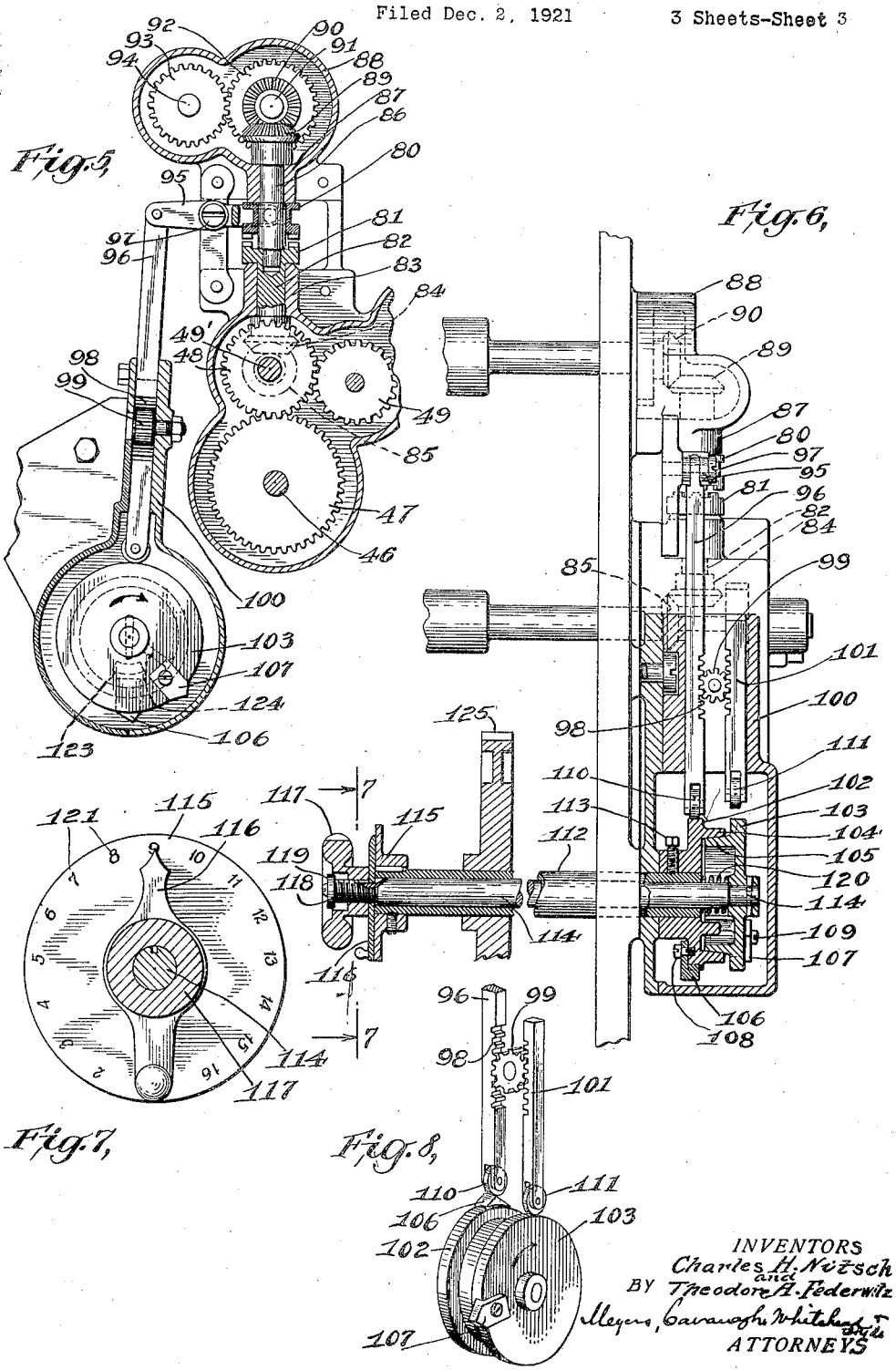

1,472,614

UNITED STATES PATENT OFFICE.

CHARLES H. NITSCH, OF LOGAN, AND THEODORE A. FEDERWITZ, OF NICETOWN, PENNSYLVANIA, ASSIGNORS TO STOKES & SMITH COMPANY, OF PHILADELPHIA, PENNSYLVANIA, A CORPORATION OF PENNSYLVANIA.

MACHINE FOR GUMMING AND CONVEYING BLANKS.

Application filed December 2, 1921. Serial No. 519,418.

*To all whom it may concern:*

Be it known that we, CHARLES H. NITSCH and THEODORE A. FEDERWITZ, citizens of the United States, and residents of Logan and Nicetown, respectively, in the county of Philadelphia and State of Pennsylvania, have invented certain new and useful Improvements in Machines for Gumming and Conveying Blanks, of which the following is a specification.

This invention relates to an adhesive applying or gumming machine and more particularly to an adhesive applying machine of the type in which label or wrapper blanks are coated with adhesive and conveyed to a delivery station for subsequent use with other machines such as, for example, a wrapper applying machine for paper boxes; and has special reference to the provision of a machine of this type in which the adhesively coated blanks will be conveyed to and delivered at the delivery station in the desired state under any of a variety of conditions of service.

In prior machines of the type referred to, wrapper blanks, after being coated with adhesive by being fed through gumming means, are received by a conveyer which conveys and delivers the gummed blanks to a delivery station at which station an operator removes the gummed blanks and feeds the same, for example, to a machine for applying the blanks to paper boxes. The conveyer is geared to the gumming means and for the purpose of adapting the machine to a wide range of wrapper sizes the gearing is such that wrappers of the largest sizes will be accommodated by and fed to the conveyer without overlapping. Since the gearing between the gumming means and the conveying means is maintained constant or non-variant, average sizes of blanks are fed by the conveyer with large spaces between the blanks. Now, in machines of this type the length of the conveyer forms a very important consideration. The conveyer, which consists usually of an endless traveler or belt, must not be made too long for the reason that space in a plant is too costly and for the further reason that the operator at the wrapping machine whose duty it is to control the operation of the gumming machine should be close to the latter to keep the same under constant surveillance. Not only should not the conveyer be made too long for commercial and practical reasons, but such conveyer should not be made too short for the reason that if the conveyer be not long enough the gummed wrappers conveyed thereby will arrive at the wrapping station with the gum or adhesive in too wet or moist a condition for use, this being undesirable. What is required is a gummed wrapper which is not too wet nor too dry when it arrives at the delivery or wrapping station, but one which has just the right condition of "tackiness" for the wrapping or blank applying step. To obtain the desired "tackiness" of any given size blank a relatively longer period of conveyance between the gumming apparatus and the wrapping station is desired than that which is provided by a short conveyer. In short, a desideratum in this type of machine involves the increasing of the time of delivery or conveyance of a gummed blank so that the blank will arrive at the wrapping station in not too wet a condition but in a "tacky" condition, this without increasing beyond practical limits the size or length of the conveyer. This, of course, could be arrived at by decreasing the speed of the machines now in use, but the decreasing of the speed of the machine would not only decrease the period of delivery or conveyance but would correspondingly decrease number of wrappers delivered in a unit of time. Decreasing the speed of the machine, therefore, so that the wrappers may be delivered in the right condition, decreases the capacity of the machine, the capacity of the operator and the capacity of the box machines used in conjunction with the gumming apparatus. Hence it is desired to vary the time of delivery of wrappers without increasing the size of the conveyer or reducing the speed of the machine and the speed of output. The provision of an apparatus in which the time or period of delivery of a gummed blank may be predetermined and varied without increasing the space requirement of the conveyer or without varying the capacity or speed of output of the machine is one of the prime desiderta of our invention.

Our invention in affording the predetermining of the time of delivery without affecting the size of the machine or speed of output, comprehends the provision of a gumming means associated with a conveying means in which the conveyer is selectively controlled for intermittent operation, the conveyer being given any predetermined period of movement and period of dwell to the end that blanks of a given size may be spaced on a given conveyer in a predetermined manner, the period of delivery therefore being selected at will with any given size of conveyer and without changing the speed of the machine. Thus, if it is desired with any given size of wrapper to increase the "tackiness" of the same as received at the delivery station, the wrappers may be fed to the conveyer in a more closely spaced condition, the periods of dwell of the conveyer being made relatively large to effect this, the time of delivery being thus increased as desired without affecting the size of the conveyer or the speed of output of the machine. In this manner for average size wrappers or blanks the conveyer may be kept within bounds and the operator at the wrapping machine may be positioned close to the gumming means to have the same under constant visible control.

With any given size wrapper blank to be fed a number of other factors may enter in for which it is desired to accommodate or adjust the machine without entailing operating disadvantages. Thus, if a new operator is put on the machine and the speed of output of such new operator is low, as is usually the case, it is necessary to cut down the speed of the machine. Conversely, if the speed of an operator increases with practise it is desired to increase the speed of operation of the machine. In prior machines, however, varying the speed of operation of the machine as a whole concomitantly varies the time or period of conveyance of a blank from the gumming means to the delivery station. If the speed of the machine is increased, for example, to suit the needs of a more experienced operator, the time or period of conveyance is decreased with the result that the wrappers arrive at the delivery station in too wet a condition. If the speed of the machine is decreased to suit the needs of a "green" or new operator the time or period of conveyance of a blank is increased and the blanks arrive at the wrapping station in too dry a condition. Varying the speed of the machine, therefore, to suit the needs of the operator cannot be done in prior machines without detrimentally affecting other important considerations. The provision of a machine in which the speed of operation may be varied to suit the needs of the operator without disturbing other important factors such as the condition of the blank delivered, is another prime desideratum of our invention.

To effect the delivery of gummed blanks in the right tacky condition still other factors must be taken into consideration. It is well known that weather conditions affect the state of the gummed blank, the drying power of the gummed blank being, of course, dependent upon the moisture content in the surrounding air. In humid weather it is desired to increase the time or period of conveyance of a blank from the gumming means to the delivery station, and this is desired to be effected without decreasing the output of the machine. The condition of the glue and the quality of the paper stock are also factors for which adjustment should be made without affecting the capacity or output of the machine. In our invention, contradistinguished from other machines of this type known to us, the weather conditions and conditions of the glue and paper stock may also be adjusted for to obtain delivered wrappers in the right tacky condition without affecting the speed or output of the machine.

In brief, with a given size of label or wrapper we may obtain in the practice of our machine a longer or shorter period of conveyance without increasing the length of the conveyer or varying the speed of the machine; we may adjust for speed of the operator without varying the time of conveyance and we may further adjust for various conditions met in service such as the state of the weather, glue or paper stock, without changing the speed of output of the machine.

The machine of our invention is adapted to perform these functions and produce these results not only for a given size label but for a variety of sizes of labels, our machine being adapted, as are the machines in prior use, for various sizes of blanks. In our machine the adjustment for the period of conveyance of a blank is preferably primarily obtained by adjusting or varying the periods of dwell of the conveyer or conversely the periods of movement of the conveyer. If a larger wrapper is desired to be fed and conveyed to the wrapping station, the period of dwell of the conveyer is decreased and the period of movement correspondingly increased, as will become clearer hereinafter. By making this adjustment for increased sizes of blanks the time of delivery of such blanks is, of course, decreased. But since the larger wrappers cannot be handled with the same rapidity by an operator as the smaller wrappers the speed of the entire machine may be reduced, with the resulting relative increase of time of delivery so that the net result is that the time of delivery of the larger wrappers may be made to be the same as the time of delivery of the smaller wrappers to obtain the same in the desired tacky condition with the wrappers properly accommodated and spaced on the conveyer. Compared with prior machines of this type where the apparatus is adjustable to different size labels, decreasing the speed of the machine for larger labels in prior machines increases the time of delivery and where the small labels are received in just the right condition the larger labels will be received in too dry a state. With the provision of our machine, therefore, in addition to adapting the machine to the speed of the operator and the condition of the delivered wrappers, the size of the wrapper blanks used in the machine may be adjusted for and all the factors may be made to interrelate in a very flexible manner to meet the various conditions of service.

To the accomplishment of the foregoing and such other objects as may hereinafter appear, our invention consists in the elements and their relation one to the other, as hereinafter particularly described and sought to be defined in the claims, reference being had to the accompanying drawings which show a preferred embodiment of our invention, and in which:

Figure 1 is a side elevational view of our machine,

Figure 2 is a front elevational view of the same as viewed from the right of Figure 1, with parts broken away and other parts shown in section, Figures 3 and 4 are detail views of part of the driving mechanism, Figure 5 is an enlarged fragmentary view of the mechanism for varying the operating conditions of the conveyer with respect to the operating conditions of the gumming means in our invention, Figure 6 is an end elevational view of the same with parts broken away and shown in section, and Figures 7 and 8 are views of details of the same.

Referring to the drawings, our invention comprises generally a magazine or blank supply station M, a gumming mechanism generally designated as G which receives the blanks from the magazine and coats the same with adhesive, and a conveyer C which receives the coated or gummed blanks from the gumming means and transmits or conveys the same to a delivery point or station at which station the operator removes the gummed blanks from the conveyer and feeds the same to associated mechanism such as, for example, a machine for covering paper boxes.

Mounted on one end of the framework 10 of the machine and located on the supports 11 forming part of the machine framework, we provide the feed table 12 which is intended for supporting a pack of blanks $b$ such as wrappers or labels. Adjustably mounted on the feed table 12 is provided the rear guide wall 13 and the side guide walls 14, one of which is shown in Figure 1 of the drawings, these guide walls comprising the walls of the magazine M. The guide walls 13 and 14 are adjustably mounted on the feed table 12 for accommodating any of a variety of sizes of blanks, the rear wall 13 being longitudinally adjustable in the feed table 12 as by means of the carriage 15 movable in suitable guides provided in the feed table 12, the side guide wall 14 being adjustable transversely of the feed table as by means of the carriage 16 movable in the guide or runway 17 in the said table, the guide walls being locked in any adjusted position as by means of the screw and wing nut means 18.

The gumming means G comprises essentially a container or pot for holding an adhesive such as gum, paste or glue and a means for transferring the adhesive from the container to a blank fed through the gumming means for supplying the same with a coating of adhesive. The adhesive container of our invention comprises preferably an inner receptacle 19 supported in an outer receptacle 20, the inner recepticle 19 being intended for the reception of the adhesive and the outer receptacle 20 comprising a heating chamber and intended for the reception of a heating medium such as water, steam or both. The outer receptacle 20 is normally closed by the inner receptacle 19 and the top wall 21 preferably formed integrally with the inner receptacle, the said top wall 21 being preferably provided with a cap or cover 22 which may be removed when it is desired to fill the inner receptacle with water. For the purpose of heating the medium in the inner receptacle we provide the same with a steam inlet 23 adapted to be connected to any steam supply. The outer receptacle may also be provided with an exit valve 24.

For the purpose of refilling the adhesive receptacle and for the purpose of cleaning the gumming elements, as will appear presently, the receptacle 20 is movably supported on the stationary framewok 10 of the machine. To this end the receptacle 20 is supported by a plurality of spaced bell crank levers 25, each of the levers being fulcrumed on a stationary bracket or support 26, one arm of each of the said levers being pivotally connected to lugs 27 preferably formed integrally with the receptacle 20, the other arms of the said levers being connected together to move in unison by means of a link or links 28. For the purpose of raising or lowering the receptacle 20 the lower arm of one of the levers 25 preferably comprises an operating handle 29. For the purpose of locking the adhesive receptacle in elevated position there is provided the spring pressed pawl 30 pivotally mounted on the handle 29, the said pawl 30 cooperating with the toothed element 31, the latter preferably being integrally formed with the support or bracket 26. The pawl 30 may be provided with a finger piece or handle 32 for moving the same, a stop 33 being provided on the handle 29 for limiting the motion of the finger piece 32. For spring tensioning pawl 30 the spring 34 may be provided. As will be clear from Figure 1 of the drawings, if it is desired to lower the receptacle 20, handle 29 is grasped and downward pressure is exerted on the finger piece 32 for releasing the pawl 30, the adhesive container being then in condition to be lowered for filling or refilling the same.

Cooperating with the inner adhesive receptacle 19 we provide the dipping roll 35, the said dipping roll being stationarily journalled in the framework of the machine as in opposed bearings 36. With the parts positioned as shown in Figures 1 and 2 of the drawings the dipping roll 35 when rotated will receive a supply of adhesive from the adhesive container 19 as is usual. For the purpose of cleaning the dipping roll 35 and the parts associated therewith, we provide means for immersing the dipping roll 35 in the outer water receptacle 20. To this end the inner receptacle 19 is mounted for slidable motion on the outer receptacle 20 and means is provided for moving the inner receptacle to permit the dipping roll 35 to be associated directly with the outer receptacle 20. To this end there is provided the screw means 37 which is threadedly mounted in the front wall 38 of the receptacle 20, the said screw means being provided with an operating handle 39 and with a grooved collar 40, the said collar engaging the forked arm 41 of an angle piece 42, the latter being attached to the top wall 21 of the inner receptacle as by means of the bolt 43. As will be apparent from Figure 1 of the drawings rotation of the handle 39 will effect the outward slidable motion of the inner receptacle 19 when the adhesive container is moved to descended position. For immersing the dipping roll 35 in the water bath of the outer receptacle 20 the parts are moved to ascended position by actuating the handle 29 and the parts are elevated so that the pawl 30 engages the inner tooth of the ratchet or toothed member 31.

Cooperating with the dipping roll 35 is provided the means for feeding the blanks from the magazine M to and through the gumming means. To this end is provided the driven gear 44 meshing with the idler 45, the latter being mounted on one end of the transverse shaft 46. On the other end of the shaft 46 is mounted the gear 47 which meshes with the idler 48, the latter mounted on the shaft 49'. Meshing with the gear 48 is provided the idler 49, the latter in turn meshing with the gear 50 mounted on the shaft 51, the said shaft 51 carrying the coating roller 52, the latter contacting the dipping roll 35. The dipping and coating rollers 35 and 52 are preferably geared together and to this end the shafts 51 and 53 of the said rollers are provided with intermeshing gears 54 and 55 respectively, as shown to the right of Figure 2 of the drawings. By the provision of this means it will be apparent that upon actuation of the driven gear 44 the motion of the same will be transmitted to the coating and dipping rolls for operating the same.

For the purpose of feeding the blanks $b$ from the magazine to the gumming means we preferably provide the feeding mechanism disclosed in the patent to Nitsch & Weightman, No. 1,388,678 of August 23, 1921. This feeding means comprises essentially a reciprocable feed mechanism including the reciprocating and rotating suction roll 56 which functions to separate from the pack of blanks the lowermost blank and feed the same forwardly. Mounted on the reciprocable feeding means is provided the separating member 57 which functions to enter between a blank fed by the suction roll 56 and the remaining blanks in the pack, the said separating member 57 being provided with a lower inclined wall as shown particularly in Figure 1 for guiding the blanks to feeding elements to be described presently. Reciprocable suction roll 56 is suitably connected for operation by the driving mechanism of the machine with suction intermittently effected in the said roll when the latter is in position to separate and feed the lowermost blank of the pack. To supply the intermittent suction in the roll 56 we provide the suction cylinder 58 of which the piston (not shown) is suitably connected to the driving parts of the apparatus, the said suction cylinder 58 being connected to the ports of the suction roll 56 as by means of the flexible tube 59. These latter parts do not form any part of our present invention, the same being fully disclosed in the said patent to Weightman & Nitsch above referred to.

After a blank is separated from the pack by the cooperation of the suction roll 56 and separating means 57 the blank is fed forward and gripped between the feed rolls 60 and 61, the feed roll 60 being mounted on the shaft 49'. With the rotation of the feed rolls 60 and 61 the blank is fed through a channel or guide 62 and thence between a guide roll 63 and the coating roll 52, the blank receiving its coating of gum or glue while moving over the coating roll 52. For the purpose of stripping or lifting the gummed blank from the coating roll 52 so that the same may be delivered to the conveyers to be described presently, we provide a plurality of spaced stripping blades 64 shown particularly in Figure 2 of the drawings, the said stripping blades being mounted on a transverse bar 65 journalled in opposed bearings in the framework of the machine, the said stripping blades being of the type shown in the patent to Morrison, No. 1,331,460 of February 17, 1920, the stripping blades having concave portions cooperating with grooves 66 provided in the coating roll 52, the cooperation of these parts effecting a more efficient stripping or lifting of the blank from the coating roll. Each of the blades 64 is also provided with a dished portion 67, this for the purpose of guiding the blanks from the coating roll to the conveyer now to be described.

For transferring or conveying the gummed blanks from the gumming means to the operator stationed at the box wrapping machine, we provide a conveyer C which comprises preferably an endless belt or apron 68 trained over a plurality of guide and feed rollers, the endless apron traveling a horizontal distance between the guide roller 69 rotatably mounted in fixed bearings 70 adjacent the wrapping or delivery station and the feed roller 71 rotatably mounted in opposed vertically movable blocks 72 the said blocks 72 being mounted for yielding or resilient vertical movement in opposed guideways 73 provided in the opposed upstanding bracket portions 74, the compression springs 75 being provided in the said guides for resiliently urging the blocks 72 and the roller 71 downwardly to effect a frictional gripping between the roller 71 and the lower horizontal reach of the apron 68, the companion roller 76 journalled for rotation in fixed bearings in the frame of the machine being provided for cooperating with the roller 71 to frictionally feed therebetween the belt or conveyer 68. From the feeding roll 71 the endless apron is inclined downwardly and is trained over a guide and feeding roll 77 journalled in fixed bearings in the framework of the machine and positioned adjacent to the stripping blades 66. For the purpose of tensioning the endless belt 68 and adjusting for variations in length thereof, the bearings 70 for the end guide roller 69 may be adjustably mounted in extended brackets 78 by means of the adjustable screw and lock nut means 79.

For the purpose of driving the conveyer or belt 68 in synchronism with the operation of the feeding and gumming means, the conveyer is connected to the means for driving the feeding and gumming mechanism. In prior machines the driving connection between the conveyer and the gumming means is maintained constant and non-variant and with such a construction it will be apparent that with a given speed of the driving mechanism the time or period of conveyance of a blank from the gumming means to the delivery or wrapping station is non-variant. A prime desideratum of our present invention, as has been referred to hereinbefore, comprehends a construction in which the time or period of conveyance of a blank between the gumming and delivery stations may be adjusted or varied without modifying the speed of the gumming means and thus without varying the capacity or output of the machine and the capacity of the operator handling the blanks. To his end our invention comprehends mechanism for connecting the conveyer to the driving means of the machine such that the operating conditions of the conveyer may be varied without varying the operating conditions of the gumming means. To accomplish this the mechanism we provide comprises means for connecting and disconnecting the conveyer in a predetered manner to the driving mechanism of the machine so that the conveyer will be intermittently operated in a given manner. With the driving means of the machine operated continuously, the conveyer is given periods of dwell and periods of motion by the provision of our mechanism, the time of conveyance of the endless belt 68 being predetermined and controlled in this manner. The mechanism by which we accomplish this preferably comprises an intermittently operated clutch active to connect and disconnect the conveyer to the driving parts of the machine. This clutch means and associated parts are shown in Figures 1, 2, 5 and 6 of the drawings and referring to these figures, we show complemental clutch elements 80 and 81, these clutch elements being caused to engage and disengage in a selected manner, as will appear more in detail presently. The clutch element 81 is mounted on or formed integrally with the shaft 82 rotatable in a casing bearing 83, the said shaft being provided at an end opposed to the clutch element 81 with the bevel gear 84 meshing with a bevel gear 85 fixed on the shaft 49′ hereinbefore referred to. By the provision of this means it will be apparent that the clutch element 81 is rotated continuously from the driven gear 44 which transmits motion to the gear 48 and shaft 49′. The complemental clutch element 80 comprises a slidable sleeve keyed to the shaft 86, the latter being journalled in the boss 87 of the gear casing 88, the said shaft 86 being provided at its upper end with a bevel gear 89 which meshes with a companion bevel gear 90 fixed on a shaft 91, the said shaft 91 carrying a pinion 92 meshing with a pinion 93, these parts being housed by the casing 88, the pinion 93 being fixed on the shaft 94, the latter shaft carrying the roller 76 hereinbefore referred to. The complemental clutch element 80 is adapted to be slidably moved on the shaft 86 for connecting and disconnecting the same in a predetermined manner to the clutch element 81. To this end we provide the lever 95, one arm of which is forked for straddling the walls of the grooved clutch element 80, the other arm of which is pivotally connected to a link 96, the lever arm 95 being suitably fulcrumed as at 97 on the framework of the machine.

The link 96 is intended for reciprocation in a predetermined manner to effect the alternate connection and disconnection between the clutch elements 80 and 81. To this end the reciprocating link 96 is provided preferably intermediate the ends thereof, with a rack portion 98 adapted to engage and rotate a pinion 99 fixedly journalled in a casing 100, the link 96 being slidably mounted for reciprocation in the casing 100. Mounted for slidable movement in the casing 100 is further provided the companion rack member 101 the teeth of which engage the pinion 99, as clearly appears in Figures 6 and 8 of the drawings. For the purpose of effecting the alternate reciprocation of the link 96 to relatively move the clutch elements for connection and disconnection, we provide the spaced wheels 102 and 103 which are adapted to rotate in unison by the frictional engagement of the annular flange portions 104 and 105 formed preferably integrally with the wheels 102 and 103 respectively. Each of the wheels 102 and 103 is provided with a cam portion 106 and 107 respectively, these cam portions comprising preferably toothed members fixedly attached to the wheels by securing means 108 and 109 respectively. The wheels 102 and 103 are intended to rotate in unison as hereinbefore referred to, and in the rotation of the same the said wheels, and more particularly the cam portions 106 and 107 thereof, are intended to cooperate with the rack elements 98 and 101 for operating the clutch elements 80 and 81. To this end the rack elements 98 and 101 are provided at their lowermost ends with rollers or followers 110 and 111 respectively, the said rollers being adapted to ride over the periphery of the wheels 102 and 103 and being adapted to be moved by the cam elements 106 and 107. Referring particularly to Figures 5 and 6 of the drawings, it will be seen that the clutch elements 80 and 81 are in disengaged position and that the follower 110 is riding upon the periphery of the wheel 102 with the cam follower 111 raised above the periphery of the wheel 103. In the rotation of the wheels. referring now to Figure 8 of the drawings, the cam 106 comes into engagement with the wheel 110, moving the same and the link 96 to elevated position and with such movement clutch 80 is caused to descend to engage clutch element 81. The rack element 101 in being reciprocated by the pinion 99 which is moved by the rack 98 is caused to descend so that the wheel 111 moves into engagement with and rides over the periphery of the wheel 103. Still referring to Figure 8 of the drawings, with the parts in this condition in the further rotation of the wheels clockwise as viewed in Figure 8, the cam element 107 will engage the roller 111 and move the same and the rack element 101 upwardly, motion of this rack element being transmitted to the link 96 to cause disengagement of the clutch in a manner as will be obvious and to cause the roller 110 to move into engagement with the periphery of the wheel 102. With this means, therefore, the clutch elements may be operated in a predetermined manner to effect an intermittent motion of the conveyer 68 and to effect periods of dwell and periods of movement therein, the periods of movement corresponding to the time taken by the cam element 107 to move from the position shown in Figure 8 to the position occupied by cam element 106, the periods of dwell corresponding to the time taken by the movement of the said cam element 107 from such position to the position occupied in Figure 8. With the provision of this means, with an intermediate size of blanks, the blanks on the conveyer 68 may be closely spaced to the end of providing a conveyer of limited and practical size as compared with conveyers in prior machines, the time of conveyance being predetermined so as to properly condition the gummed blanks and render the same tacky before they are removed by the operator at the wrapping station. By providing the intermittent operation of the conveyer these ends may be accomplished without changing the speed of the machine and therefore without changing its output or the capacity of the operator.

In addition to intermittently operating the conveyer 68 in a predetermined manner, a further and prime desideratum of our invention comprehends a construction in which intermittent operation may be varied as required by the needs of service. As hereinbefore referred to, due to the speed requirements of the operator and due to the factors of weather and condition of the gum and paper stock, it is desired to provide means for varying the time of conveyance of a blank over the distance between the gumming means and the wrapping station without varying the speed of the machine. This adjustment is desired to be made for the above reasons not only, but to adapt the machine to various size blanks and to feed such blanks in closely spaced position. To this end we provide means for adjusting the relation between the cam elements 106 and 107 and more specifically for varying the spacing of these cam elements in order to vary the dwell periods of the conveyer with respect to the moving periods thereof without changing the cyclic period of operation of the conveyor. To this end the wheels 102 and 103 are adjustably mounted relative to each other, the wheels being relatively rotatably adjusted. To provide this the wheel 102 is fixedly attached to the sleeve 112 as by means of the securing element 113 and the wheel 103 is fixedly attached to the shaft 114 concentric with the sleeve 112, the wheels being connected to the sleeve and shaft at one end of the same. Keyed to the other end of the sleeve 112 we provide the flanged collar 115 and keyed to the shaft 114 at such end we provide the integral handle and pointer 116. The flanged collar 115 and the handle and pointer 116 may be locked together in any adjusted position by means of the handle wheel 117, the latter being threaded for rotation on the threaded end 118 of the shaft 114, a washer 119 being provided to prevent complete withdrawal of the handle wheel 117. When these parts are locked in position the wheels 102 and 103 rotate in unison as hereinbefore described. When it is desired to change the relative positions of the cam elements 106 and 107 the handle wheel 117 is loosened to unlock the handle and pointer 116 from the flanged collar 115 and when this unlocking is effected a spring 120 located between the wheels 102 and 103 and surrounding the shaft 114 is active to spread the wheels 102 and 103 to permit relative rotation thereof. The handle 116 is then rotated with respect to the collar 115 to relatively position the cam elements 106 and 107 in any desired manner. After this is accomplished the parts may again be locked in position so that the wheels 102 and 103 again rotate in unison. For the purpose of quickly setting or adjusting the wheels 102 and 103, we may provide the flanged collar 115 with a peripheral scale 121 shown in Figure 7 of the drawings and the said scale may be made to correspond with a similar scale 122 fixed to the feed table 12, the adjustments being made for any given speed of operator in correspondence to the sizes of labels used. To the end that the rack elements 98 and 101 will not be moved in opposed relation simultaneously, the wheel 102 may be provided with an arcuate portion 123 and the wheel 103 may be provided with a stop element 124, the cooperation of these parts as shown in Figure 5 preventing the cam elements 106 and 107 from occupying the same positions. It may be here remarked that the elements 106 and 107 are shown in a relative position different from that shown in Figures 6 and 8 of the drawings, the parts in Figure 5 corresponding to a very short period of conveyer movement.

For the purpose of operating the wheels 102 and 103 the sleeve 112 is provided with a gear 125, the said gear 125 meshing with a companion gear 126, the latter being fixed to the shaft 46.

By the provision of the means hereinbefore described the conveyer is thus operated intermittently to advance the blanks. For the purpose of gripping the blanks as they are fed from the gumming means to the conveyer, we provide the overlying chain 180, the said chain being trained over the upper wheel 181, mounted on the rod 182 journalled in opposed bearings 74, the lower end of the chain 180 being trained over the sprocket wheel 183 fixed to the rod 184 rotatable in the opposed bearings 185. In operation the chain 180, moving over the inclined portion of the belt 68, grips the blanks received from the gumming means and holds the same on the belt during the forward motion of the top reach of the belt 68. For the purpose of preventing the relative movement of the chain 180 and the belt 68 resulting from the inertia of the parts, when the belt 68 is intermittently stopped or moved, a second and underlying chain 186 is provided movable over the rollers 71 and 77, the rollers being suitably grooved and provided with pins as shown, for example, at 187 in the roller 71 (see Figure 2) so that the chain 186 may be positively driven from the friction roller 71 and so that the chain may positively drive the roller 77. The roller 77 is positively geared, furthermore, to the shaft 184 so that these parts may be operated in unison to prevent relative movement between the upper chain and the belt and to this end the shaft of the roller 77 and the shaft 184 are provided with intermeshing gears 188 and 189 respectively, shown particularly to the right of Figure 2.

For driving the parts of the machine described, we preferably provide a motor 127 mounted on the base 128 which, in turn, is supported on the framework 10 of the machine, the said motor transmitting motion to companion clutch elements 129 and 130 by means of the driving belt 131 which is trained over the clutch wheel 129 and the wheel 132 on the shaft of the motor 127. The clutch element 130 is slidably mounted on a shaft 133, the clutch wheel 129 being freely rotatable on the said shaft. Normally the clutch element 130 is caused to engage the complemental clutch wheel 129 and is urged resiliently in frictional contact therewith by means of the compression spring 134. For disengaging the machine from the motor we may provide the hand controlled lever 135 located adjacent the shaft 133, this lever being provided for control by the operator when he assumes a position adjacent the gumming elements. The control lever 135 is freely fulcrumed on a gear casing 136 and the said lever is connected, as by means of a rod 137, to a forked member 138 straddling a grooved collar 139 attached to or formed integrally with the clutch element 130. The clutch element 130 may be also operated from a point adjacent the wrapping machine and to this end we provide an arm 140 oscillatably mounted on the rod 137, the said arm 140 being connected by means of the link 141 (see Figure 1 of the drawings) to a treadle (not shown) positioned adjacent the wrapping station. The arm 140 is provided with raised portions 142 (see Figure 2) which are adapted to seat in a groove 143 provided in a boss 144 in which the rod 137 is oscillatable, the raised portion 142 seating in the groove 143 when the clutch element 130 engages the clutch element 129. When it is desired to spread the clutch elements the link 141 is pulled by the treadle (not shown) this effecting the rotation of the arm 140 and causing the projection 142 to ride out of the groove 143, the arm 140 acting against the collar 145 causing the lateral movement of the rod 137 and the disengagement of the clutch elements.

For the purpose of varying the speed of the machine to suit various needs of operating conditions we provide the opposedly mounted cone pulleys 146 and 147, the driving belt 148 being trained over the opposed pulleys, the said driving belt 148 being laterally adjustable on the said pulleys. The pulley 146 is driven from the clutch elements 129 and 130 by means of gears 149 and 150 mounted on the cone pulley shaft 151 and the clutch shaft 133 respectively, the gears 149 and 150 being housed by the casing 136. For varying the position of the belt 148 we provide the carriage 152 spacedly guided in the rod 153 and the endless screw or worm 154, the latter providing means for laterally moving the carriage to effect movement of the belt. The carriage 152 is provided with opposed guide portions 155 and 156 for receiving therebetween the two reaches of the belt 148. The carriage is bored and suitably tapped as at 157 and this part is in threaded engagement with the endless screw 154. The screw 154 is suitably journalled in opposed bearings 158 and one end of the said screw is provided with a rotating handle 159 to effect rotation of the screw. As the handle 159 is rotated it will be apparent that the carriage 157 will be moved laterally of the machine and this as will be obvious, will effect the lateral movement of the belt 148 and will vary in turn the speed of operation of the machine. For the purpose of suitably tensioning the belt 148 we may provide the lever 160 pivotally mounted on the carriage 152 about the guide rod 153, one arm of the lever 160 being provided with a roller 161 in engagement with the belt 148, the other arm 162 of the lever being suitably tapped for the reception of an adjustable screw 163, the said screw abutting against a stop member 164, the hand wheel 165 being provided for rotating the screw and adjusting the position of the lever 160 for suitably tensioning the belt.

For the purpose of operating the machine independently of the motor 127 as when the same is desired to be turned over by hand, the cone pulley 147 may be provided with the ball clutch shown in Figures 3 and 4 of the drawings. To this end the cone pulley 147 is provided with the flanged annulus 166 and the driven shaft 167 is provided with the recessed member 168, the recesses of which enclose a plurality of spaced spring pressed rollers 169 which are normally urged in cooperative engagement with the annulus 166 and the recessed clutch element 168 by means of spring elements 170 and plungers 171, these elements comprising the usual type of ball or roller clutch. The shaft 167 is provided at one end such as the end opposite the clutch elements with a squared portion or the like 172, adapted for the reception of a crank so that the shaft 167 may be rotated by a hand operated means independent of the cone pulley 147. As will be apparent from Figure 4, when the pulley is rotated in the direction shown by the arrow the clutch elements are operative to rotate the driven shaft 167. If, however, the driven shaft is rotated by hand in the same direction the machine may be turned over or operated independent of the cone clutch.

The operation of our machine will, in the main, be apparent from the above detailed description thereof. It will be apparent that we have provided a machine in which the time taken for conveying a blank from the gumming means M to the delivery station may be varied to suitably condition the gummed blank before use without changing the speed of the machine, this being obtained by an adjustment or relative movement of the cam wheels 102 and 103. It will be further apparent that by this means blanks of average size may be more closely spaced on the conveyer than in prior machines without decreasing the time of conveyance and that the gummed blanks may be obtained in the right condition for application to paper boxes or the like without enlarging or lengthening the size of the conveyer beyond practical limits. It will be further apparent that the adjustment of the wheels 102 and 103 is made to adapt the machine to various sizes of blanks, the blanks of differing sizes being suitably spaced on the conveyer as is desired, and the time of conveyance properly adjusted. It will be further understood that in the practise of our invention the speed of the machine may be altered to suit the needs of the operator without undesirably affecting the time of conveyance and the condition of the gummed blanks. Thus, the speed of the machine may be increased as the operator becomes more experienced by means of the adjustment of the belt 148 and by suitably adjusting the cam wheels 102 and 103 to effect longer periods of dwell in the conveyer so that the time of conveyance may be maintained constant. Similarly, it will be understood that if the speed of the machine is desired to be decreased to suit the needs of a new "hand," this may be done without increasing the time of conveyance of a blank, the cam wheels 102 and 103 being adjusted to decrease the periods of dwell of the conveyer. Assuming a given speed of operation, adjustments for time of conveyance are made directly dependent upon the size of the blanks used and the corresponding scales 121 and 122 are provided to this end. It will be understood, however, that this correspondence is only a rough approximation, for the correspondence will vary, depending upon the condition of the weather and other factors, as the condition of the glue and the paper stock, for which factors adjustment in our invention may be properly made. In short, it will be apparent that with the provision of our invention a variety of factors may be compensated for and the machine properly adjusted to convey or transmit gummed wrappers to the operator in a condition best suited for use without undesirably affecting other important factors and considerations of operation.

While we have shown our device in the preferred form, it will be obvious that many changes and modifications may be made in the structure disclosed without departing from the spirit of the invention, defined in the following claims.

We claim:

1. In an apparatus for gumming blanks and conveying the same to a delivery point, means for gumming the blanks, means for conveying the gummed blanks the distance from the gumming means to a delivery station and means for varying the operating conditions of the conveying means relative to the operating conditions of the gumming means whereby the period of conveyance of the blanks over the said distance may be varied.

2. In a apparatus of the class described, means for feeding articles, means for conveying the articles the distance from the feeding means to a delivery station and means for varying the operating conditions of the conveying means relative to the operating conditions of the feeding means whereby the period of conveyance of the articles over the said distance may be varied.

3. In an apparatus for gumming blanks and conveying the same to a delivery point, means for gumming the blanks, means for conveying the gummed blanks the distance from the gumming means to a delivery station and means for varying the period of time taken by the conveying means to convey a blank over the said distance without varying the operating conditions of the gumming means.

4. In an apparatus of the class described, means for feeding articles, means for conveying the articles the distance from the said feeding means to a delivery station and means for varying the period of conveyance of an article over the said distance without changing the operating conditions of the feeding means.

5. In an apparatus for gumming blanks and conveying the same to a delivery point, means for gumming the blanks, means for conveying the gummed blanks the distance from the gumming means to a delivery station and means for varying the ratio of the period of conveyance of a blank over the said distance and the time interval between deliveries of successive blanks.

6. In an apparatus of the class described, means for feeding articles, means for conveying the articles the distance from the feeding means to a delivery station and means for varying the ratio of the period of conveyance of an article over the said distance and the time interval between deliveries of successive articles.

7. In an apparatus of the class described, means for feeding blanks, means for conveying the blanks from the said feeding means to a delivery station and means for predetermining the spacing of blanks on the conveying means.

8. In an apparatus for gumming blanks and conveying the same to a delivery point, means for gumming the blanks, and variable intermittently operable conveying means for receiving the gummed blanks and conveying the same to the delivery point.

9. In an apparatus of the class described, means for feeding articles, intermittently operable means for conveying the articles from the said feeding means to a delivery station, the said intermittently operable conveying means having alternate dwell and moving periods and means for varying the dwell period with respect to the moving period of the said conveying means.

10. In an apparatus for gumming blanks and conveying the same to a delivery point, means for gumming the blanks, intermittently operable means for conveying the gummed blanks from the gumming means to a delivery station, the said intermittently operable conveying means having alternate dwell and moving periods and means for varying the dwell periods with respect to the moving periods of the said conveying means.

11. In an apparatus for gumming blanks and conveying the same to a delivery point, means for gumming the blanks, intermittently operable means for conveying the gummed blanks from the gumming means to a delivery station, the said intermittently operable conveying means having alternate dwell and moving periods and means for varying the dwell periods with respect to the moving periods of the said conveying means, the said conveying means comprising an endless belt carrier upon which the blanks are deposited for conveyance to the delivery station.

12. In an apparatus for gumming blanks and conveying the same to a delivery point, means for gumming the blanks, an endless conveyer extending from the gumming means to a delivery station and operative to receive the blanks and convey the same the distance from the gumming means to the delivery station and means for varying the operating conditions of the endless conveyer relative to the operating conditions of the gumming means whereby the period of conveyance of the blanks over the said distance may be varied.

13. In an apparatus of the class described, a wrapper supply station, a gumming means, means for feeding wrapper blanks from the supply station to and through the gumming means, provisions for continuously operating the feeding and gumming means, an intermittently operable conveyer and mechanism for connecting and disconnecting the conveyer to the said provisions whereby the conveyer is intermittently operated.

14. In an apparatus for gumming blanks and conveying the same to a delivery point, means for gumming the blanks, means for conveying the gummed blanks from the gumming means to a delivery station, provisions for operating the gumming means and mechanism for connecting and disconnecting the conveyer to said provisions whereby the conveyer is intermittently operated.

15. In an apparatus for gumming blanks and conveying the same to a delivery point, means for gumming the blanks, means for conveying the gummed blanks from the gumming means to a delivery station, provisions for operating the gumming means and adjustable mechanism for connecting and disconnecting the conveyer to said provisions whereby the conveyer is intermittently operated.

16. In an apparatus of the class described, means for feeding articles, means for conveying the blanks the distance from the said feeding means to a delivery station, provisions for operating the said feeding means and mechanism for connecting and disconnecting the conveyer to said provisions whereby the conveyer is intermittently operated.

17. In an apparatus of the class described, means for feeding articles, means for conveying the blanks the distance from the said feeding means to a delivery station, provisions for operating the said feeding means, mechanism for connecting and disconnecting the conveyer to said provisions whereby the conveyer is intermittently operated and means for adjusting the said mechanism whereby the intermittent operation of the conveyer may be varied.

18. In an apparatus for gumming blanks and conveying the same to a delivery point, means for gumming the blanks, means for conveying the gummed blanks from the gumming means to a delivery station, provisions for operating the gumming means, a clutch mechanism connecting the said provisions with the conveyer and instrumentalities for operating the clutch mechanism in a predetermined manner.

19. In an apparatus for gumming blanks and conveying the same to a delivery point, means for gumming the blanks, means for conveying the gummed blanks from the gumming means to a delivery station, provisions for operating the gumming means, a clutch mechanism connecting the said provisions with the conveyer and adjustable instrumentalities for operating the clutch mechanism in a predetermined manner whereby the conveyer may be intermittently operated and the intermittent operation varied.

20. In an apparatus for gumming blanks and conveying the same to a delivery point, means for gumming the blanks, means for conveying the gummed blanks from the gumming means to a delivery station, provisions for operating the gumming means, a clutch mechanism connecting the said provisions with the conveyer, adjustable instrumentalities for operating the clutch mechanism in a predetermined manner whereby the conveyer may be intermittently operated and the intermittent operation varied and means for adjusting the said instrumentalities.

21. In an apparatus of the class described, means for feeding articles, means for conveying the articles the distance from the said feeding means to a delivery station, means for varying the period of conveyance of an article over the said distance without changing the operating conditions of the feeding means, and means for changing the operating conditions of the feeding means.

22. In an apparatus of the class described, a wrapper supply station, a gumming means, means for feeding wrapper blanks from the supply station to and through the gumming means, provisions for continuously operating the feeding and gumming means, an intermittently operable conveyer, mechanism for connecting and disconnecting the conveyer to the said provisions whereby the conveyer is intermittently operated without varying the speed of operation of the gumming means, and means for varying the speed of operation of both the gumming means and the conveyer.

Signed at Philadelphia, in the county of Philadelphia and State of Pennsylvania, this 28th day of November, A. D. 1921.

CHARLES H. NITSCH.
THEODORE A. FEDERWITZ.